(12) United States Patent
Hu et al.

(10) Patent No.: US 10,458,102 B2
(45) Date of Patent: Oct. 29, 2019

(54) MULTI-FUNCTION DEVICE CAPABLE OF TEMPORARILY STOPPING WATER OUTPUT

(71) Applicant: RUNNER (XIAMEN) CORP., Xiamen (CN)

(72) Inventors: Xin-Zhan Hu, Xiamen (CN); Chun-Hui Lin, Xiamen (CN); Wen Gao, Xiamen (CN)

(73) Assignee: RUNNER (XIAMEN) CORP., Jimei, Xiamen (CN)

( * ) Notice: Subject to any disclaimer, the term of this patent is extended or adjusted under 35 U.S.C. 154(b) by 121 days.

(21) Appl. No.: 15/689,634

(22) Filed: Aug. 29, 2017

(65) Prior Publication Data

US 2018/0058048 A1    Mar. 1, 2018

(30) Foreign Application Priority Data

Aug. 30, 2016 (CN) .......................... 2016 1 0759638

(51) Int. Cl.
| | |
|---|---|
| *B05B 1/18* | (2006.01) |
| *E03C 1/02* | (2006.01) |
| *F16K 31/53* | (2006.01) |
| *F16K 5/04* | (2006.01) |
| *B05B 1/16* | (2006.01) |
| *E03C 1/04* | (2006.01) |
| *B05B 15/654* | (2018.01) |

(52) U.S. Cl.
CPC ............ *E03C 1/025* (2013.01); *B05B 1/1636* (2013.01); *E03C 1/0409* (2013.01); *F16K 5/0407* (2013.01); *F16K 31/535* (2013.01); *B05B 1/18* (2013.01); *B05B 15/654* (2018.02)

(58) Field of Classification Search
CPC ..... E03C 1/025; E03C 1/0409; B05B 1/1636; B05B 1/18; B05B 15/654; F16K 5/0407; F16K 31/535
See application file for complete search history.

(56) References Cited

U.S. PATENT DOCUMENTS

| | | | | |
|---|---|---|---|---|
| 5,433,384 A | * | 7/1995 | Chan ..................... | B05B 1/1636 239/239 |
| 5,653,260 A | * | 8/1997 | Huber ..................... | E03C 1/021 137/625.33 |
| 5,871,296 A | * | 2/1999 | Furukawa ............ | B43K 5/1881 401/106 |

(Continued)

*Primary Examiner* — Matthew W Jellett
*Assistant Examiner* — Christopher D Ballman
(74) *Attorney, Agent, or Firm* — Chun-Ming Shih

(57) ABSTRACT

A multi-function device capable of temporarily stopping water output, comprising: a water output device, having a water input end and a water output end, the water output device is provided with a plurality of water channels inside, to connect to the water input end and the water output end; and a switching mechanism, disposed in the water output device, to drive water flow to flow or stop, to realize water switching, the switching mechanism is located in the water channels nearing the water input end. The multi-function device is compact in structure. Wherein, the switching mechanism is positioned to block the water channel before water enters into the switching chamber. Therefore, weight of the water output device will not be increased, while avoiding damages to the water separation plate and the tight seal piece caused by higher water pressure.

6 Claims, 5 Drawing Sheets

(56) References Cited

U.S. PATENT DOCUMENTS

| | | | | |
|---|---|---|---|---|
| 6,233,758 B1* | 5/2001 | Jeong | ................ | B05B 1/302 |
| | | | | 137/39 |
| 6,738,996 B1* | 5/2004 | Malek | ................ | B05B 1/1618 |
| | | | | 239/441 |
| 7,000,854 B2* | 2/2006 | Malek | ................ | B05B 1/1618 |
| | | | | 137/625.48 |
| 7,070,125 B2* | 7/2006 | Williams | ................ | B05B 1/1618 |
| | | | | 239/443 |
| 7,341,239 B2* | 3/2008 | Hodel | ................ | F16K 31/52416 |
| | | | | 137/872 |
| 7,854,401 B2* | 12/2010 | Malek | ................ | B05B 1/1618 |
| | | | | 137/801 |
| 7,871,020 B2* | 1/2011 | Nelson | ................ | E03C 1/0404 |
| | | | | 137/801 |
| 7,909,269 B2* | 3/2011 | Erickson | ................ | B05B 1/1618 |
| | | | | 137/801 |
| 8,632,023 B2* | 1/2014 | Miller | ................ | B05B 1/18 |
| | | | | 239/443 |
| 9,181,685 B2* | 11/2015 | Esche | ................ | E03C 1/0404 |
| 9,623,423 B2* | 4/2017 | Erickson | ................ | E03C 1/084 |
| 9,656,280 B2* | 5/2017 | Pitsch | ................ | B05B 1/169 |
| 2007/0194148 A1* | 8/2007 | Rosko | ................ | B05B 1/1609 |
| | | | | 239/526 |
| 2008/0023577 A1* | 1/2008 | Zhen | ................ | B05B 1/1618 |
| | | | | 239/449 |
| 2010/0237160 A1* | 9/2010 | Miller | ................ | B05B 1/1681 |
| | | | | 239/1 |

* cited by examiner

MULTI-FUNCTION DEVICE CAPABLE OF TEMPORARILY STOPPING WATER OUTPUT

BACKGROUND OF THE INVENTION

Field of the Invention

The present invention relates to a multi-function device, and in particular to a multi-function device capable of temporarily stopping water output.

The Prior Arts

Presently, the water output device having multi-function module capable of temporarily stopping water output, is usually provided with water switching capabilities. In this device, water flows through a water switching chamber, and then water is ejected out of the water output holes of the nozzles. Meanwhile, a water channel blocking mechanism is disposed in the water switching chamber, such that in the water output temporary stop process, water is accumulated in the water switching chamber. In case the water output device is a shower head, that could be rather heavy for a user to hold. In addition, since the pressure in the water switching chamber tends to increase significantly, that could cause damages to the related tight seal members and the related switching members.

Therefore, presently, the design and performance of the water output device having multi-function module capable of temporarily stopping water output is not quite satisfactory, and it leaves much room for improvement.

SUMMARY OF THE INVENTION

In view of the problems and drawbacks of the prior art, the present invention provides a multi-function device capable of temporarily stopping water output, to overcome the shortcomings of the prior art.

In order to achieve the objective mentioned above, the present invention provides a multi-function device capable of temporarily stopping water output, comprising: a water output device, having a water input end and a water output end, the water output device is provided with a plurality of water channels inside, to connect to the water input end and the water output end; and a switching mechanism, disposed in the water output device, to drive water flow to flow or stop, to realize water switching, the switching mechanism is located in the water channels nearing the water input end.

In an aspect of the present invention, the switching mechanism comprises: a tight seal chamber, disposed in the water channels, and it includes: a switching chamber, connected and in communication with the water output end; a water temporary stop chamber, connected and in communication with the water input end; a separation piece, used to separate the switching chamber and the water temporary stop chamber; a rotation shaft, penetrating through the separation piece, and having a barrier plate, used to close the water temporary stop chamber and a connection port of the water input end; and a driving mechanism, located at one end of the rotation shaft near the water temporary stop chamber, and is used to drive the rotation shaft.

In another aspect of the present invention, the driving mechanism further includes: a press key, the rotation shaft is provided with continuous tooth faces facing the press key; a ratchet, disposed at one end of the press key facing the rotation shaft, to act in cooperation with the tooth faces; and an elastic piece, disposed at the other end of the rotation shaft, used to restore the rotation shaft.

In a yet another aspect of the present invention, in the water output device is provided with the plurality of water channels, the separation piece is a tight seal pad, a water separation plate is connected and fixed to one end of the rotation shaft near the switching chamber, used to control switching of the water channels, the tight seal pad and the water separation plate are each provided with corresponding water flow through holes, to allow water flow to pass through.

In a further aspect of the present invention, the water output device comprises a shell, that includes: an engine sleeve piece, fixed in the shell; an engine main body, disposed at one side of the engine sleeve piece; a tight seal cover, disposed at one other side of the engine sleeve piece; and a driving rod, used to drive the press key to realize pressing; the water separation plate and the tight seal pad are each disposed between the engine sleeve piece and the tight seal cover, the elastic piece is a spring, and the spring is disposed between the water separation plate and the tight seal cover, one end of the press key is disposed in the engine main body, while the other end is disposed protruding out of the engine main body.

In another aspect of the present invention, the driving rod is of a crutch shape, with its outer end provided with a fold button, used to push the driving rod to move, the fold button is of an angle shape, with its angle portion hinge-connected to the shell, an outer end of the fold button is disposed outside the shell, an upper end of the fold button acts in cooperation with an outer end of the driving rod.

In a yet another aspect of the present invention, the water temporary stop chamber is in communication with the plurality of connection ports of the water input end, disposed around its peripheral, and an angle between the adjacent connection ports corresponds to an angle of each rotation of the rotation shaft.

Compared with the Prior Art, the present invention has the advantages that, it is compact in structure and effective in connection. Wherein, the switching mechanism is positioned to block the water channel before water enters into the switching chamber. As such, it changes the situation for the existing water output device having water temporary stop structure, that water remains in the switching chamber to cause increase of pressure, after water output is stopped. Therefore, weight of the water output device will not be increased, while avoiding damages to the water separation plate and the tight seal piece caused by higher water pressure.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
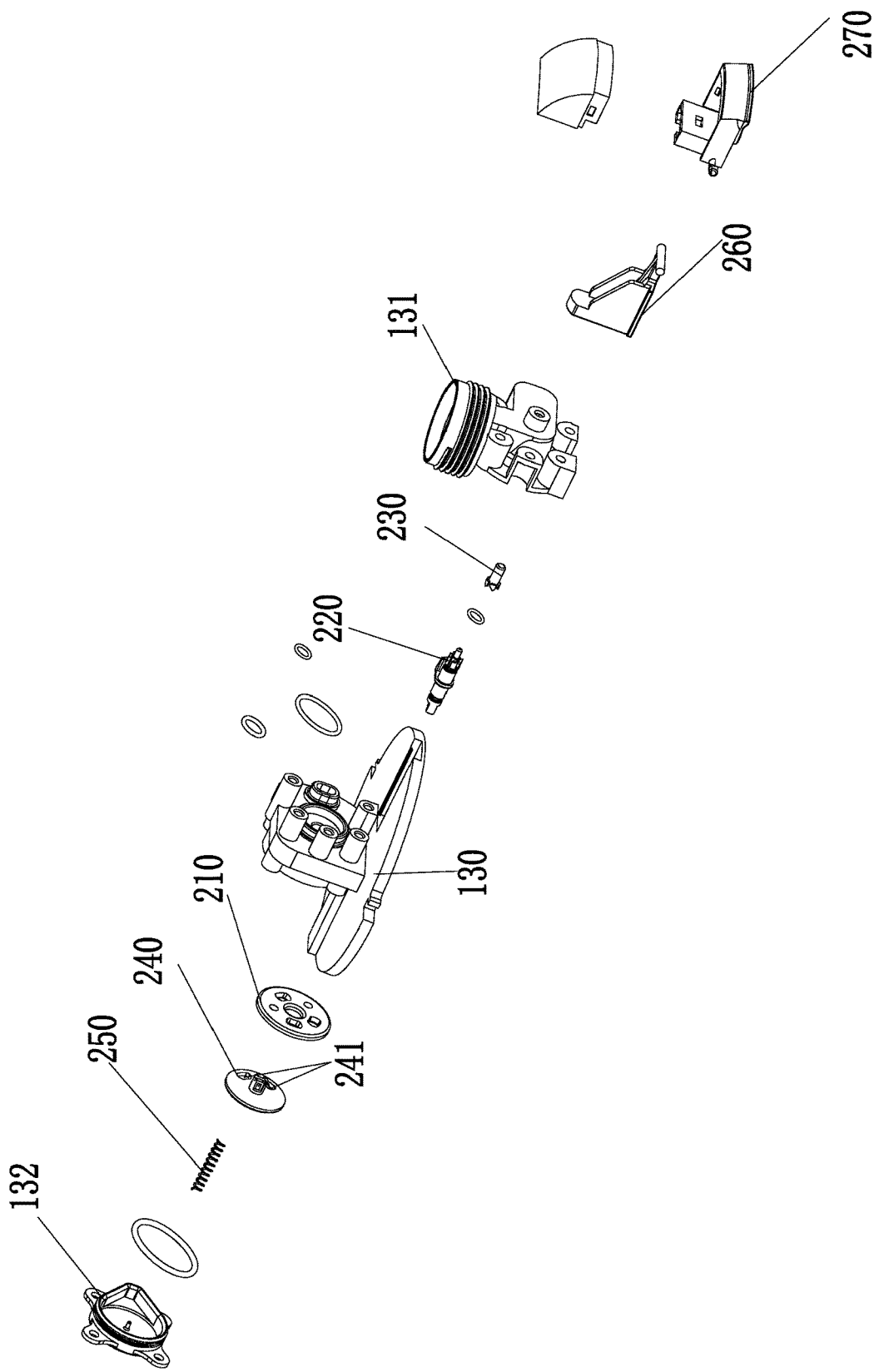
FIG. 1 is an exploded view of a switching mechanism in a shell according to an embodiment of the present invention.
Figure 2:
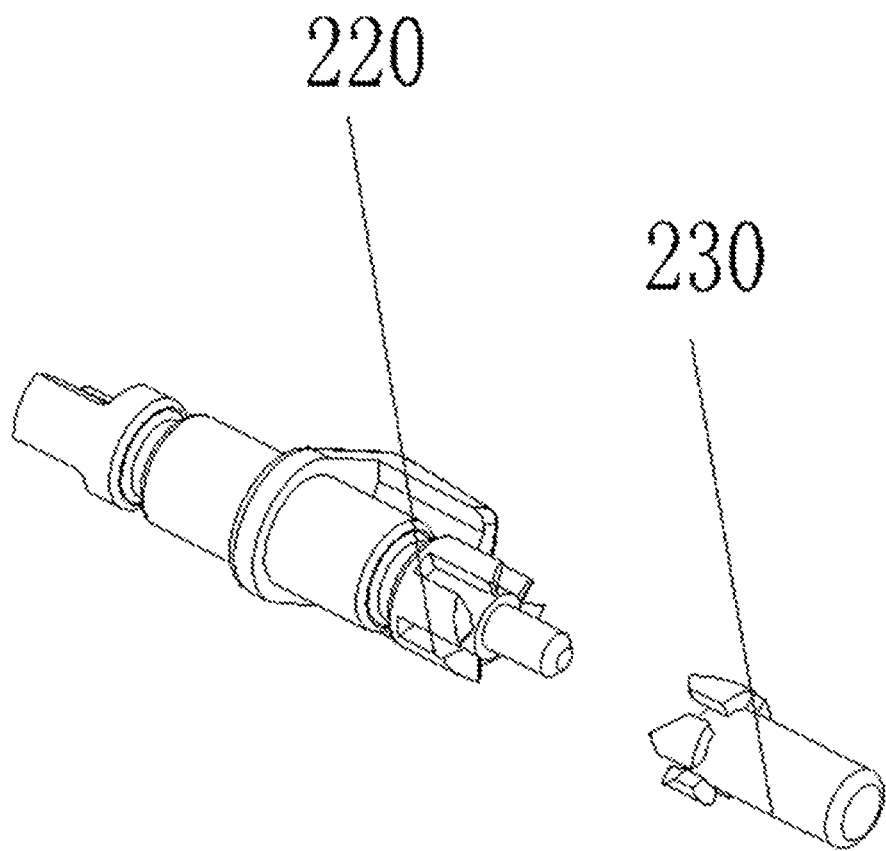
FIG. 2 is a schematic diagram of a press key and a rotation shaft acting in cooperation according to an embodiment of the present invention.
Figure 3:
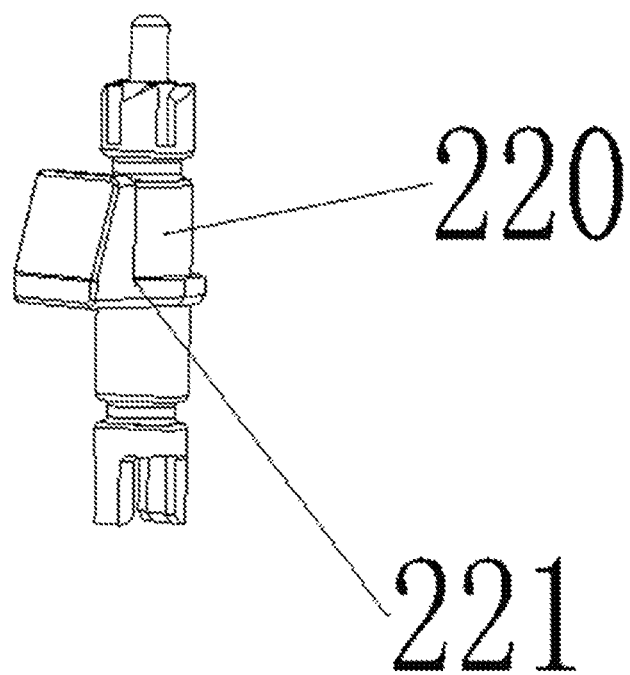
FIG. 3 is a schematic diagram of a rotation shaft according to an embodiment of the present invention.
Figure 4:
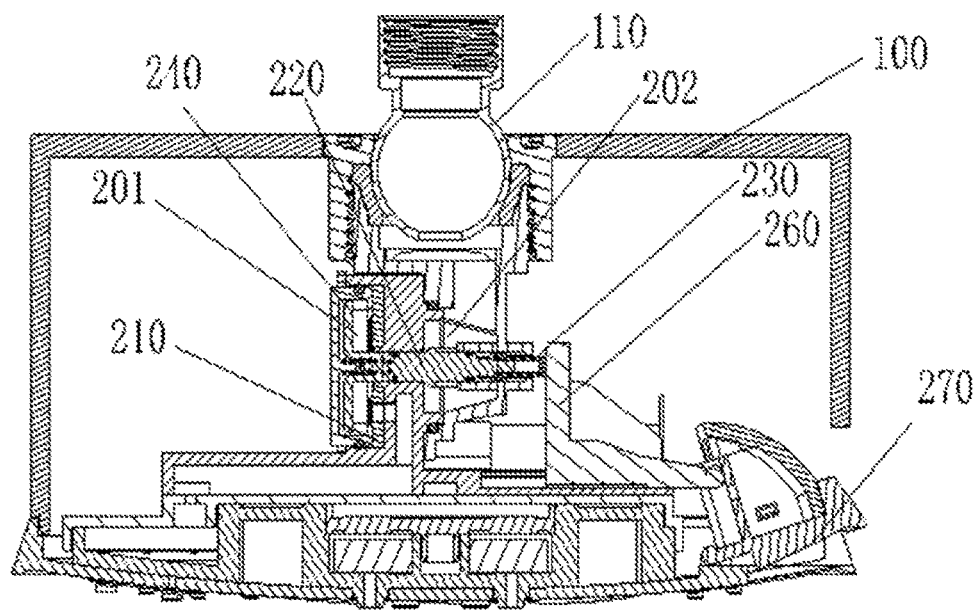
FIG. 4 is a schematic diagram of a multi-function device capable of temporarily stopping water output, when the fold button is pressed, according to an embodiment of the present invention.
Figure 5:
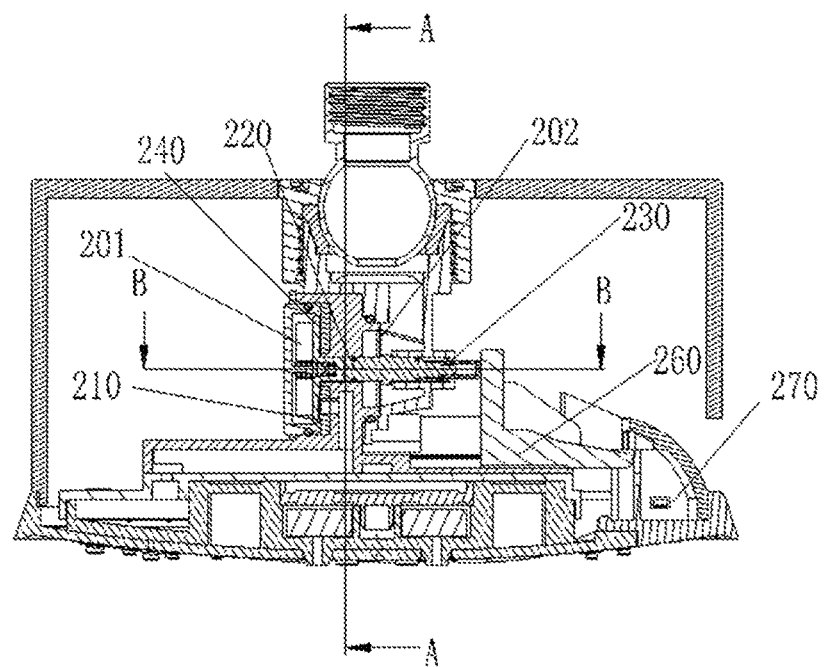
FIG. 5 is a schematic diagram of a multi-function device capable of temporarily stopping water output, when the fold button is released, according to an embodiment of the present invention.
Figure 6:
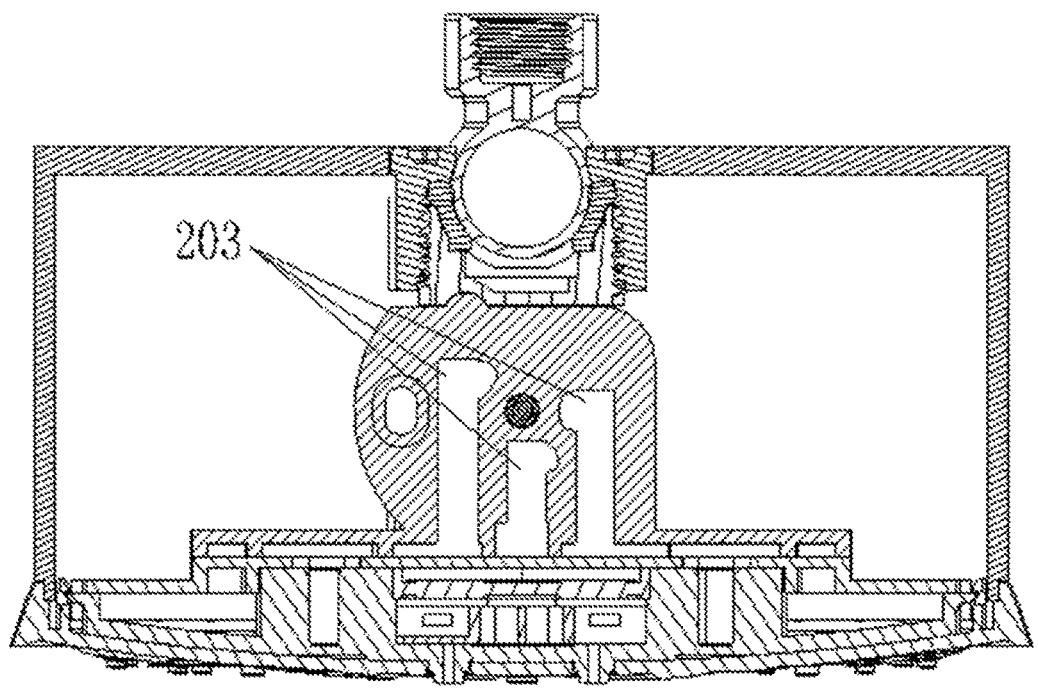
FIG. 6 is a schematic diagram of a multi-function device capable of temporarily stopping water output along the A-A line of FIG. 5, according to an embodiment of the present invention.
Figure 7:
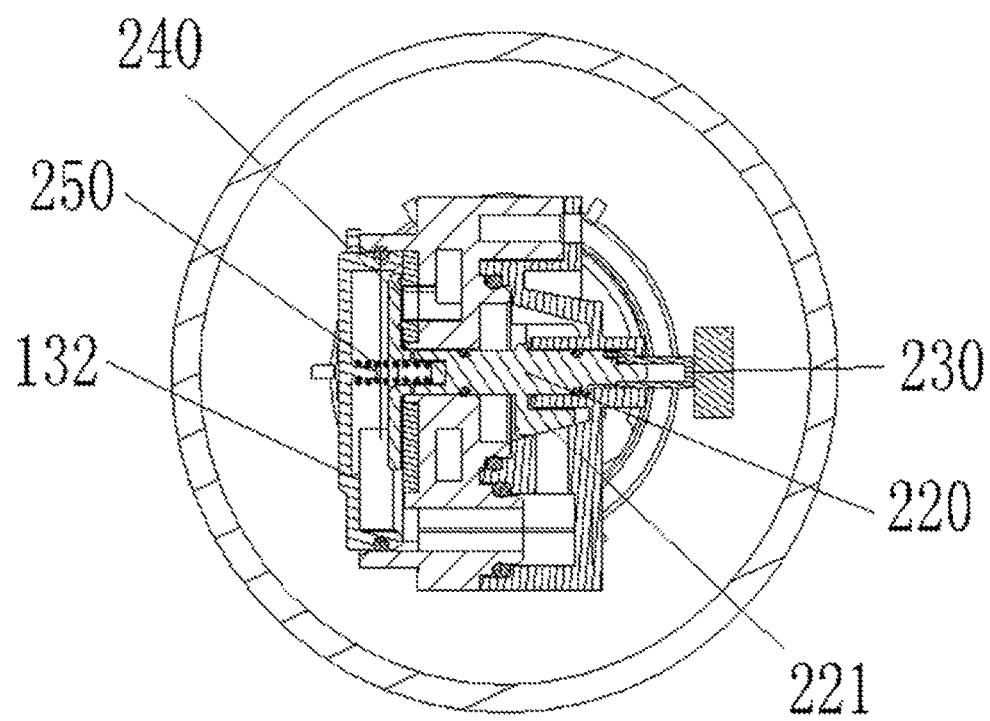
FIG. 7 is a schematic diagram of a multi-function device capable of temporarily stopping water output along the B-B line of FIG. 5 (with the shell removed), according to an embodiment of the present invention.

Refer to FIGS. 1 to 7 respectively for an exploded view of a switching mechanism in a shell according to an embodiment of the present invention; a schematic diagram of a press key and a rotation shaft acting in cooperation according to an embodiment of the present invention; a schematic diagram of a rotation shaft according to an embodiment of the present invention; a schematic diagram of a multi-function device capable of temporarily stopping water output, when a fold button is pressed, according to an embodiment of the present invention; a schematic diagram of a multi-function device capable of temporarily stopping water output, when a fold button is released, according to an embodiment of the present invention; a schematic diagram of a multi-function device capable of temporarily stopping water output along the A-A line of FIG. 5, according to an embodiment of the present invention; and a schematic diagram of a multi-function device capable of temporarily stopping water output along the B-B line of FIG. 5 (with the shell removed), according to an embodiment of the present invention.

As shown in FIGS. 1 to 7, the present invention provides a multi-function device capable of temporarily stopping water output, for which a shower head is taken as an example for explanation. The multi-function device mainly includes a shell 100. Inside the shell 100 is provided with an engine sleeve piece 130, an engine main body 131, and a tight seal cover 132. A ball head 110 is disposed on a top portion of the shell 100, to allow water to flow through the ball head 110 into the shell 100. The engine sleeve piece 130 is fixed in the middle portion of the shell 100. The engine main body 131 is disposed on one side of the engine sleeve piece 130, while a tight seal cover 132 is disposed on the other side of the engine sleeve piece 130. In the engine sleeve piece 130 is provided with a switching mechanism and a water temporary stop mechanism.

In the present embodiment, the engine sleeve piece 130, the engine main body 131, and the tight seal cover 132 act in cooperation to form a tight seal chamber to control the water channel. In the tight seal chamber is provided with a tight seal pad 210. The tight seal pad 210 and the engine sleeve piece 130 partition the tight seal chamber into: a switching chamber 201, connected and in communication with the water output end; and a water temporary stop chamber 202, connected and in communication with the water input end. A rotation shaft 220 is provided in the tight seal chamber penetrating through the tight seal pad 210. A block plate 221 is disposed in the middle portion of the rotation shaft 220, used to close the water temporary stop chamber 202 and the connection port 203 of the water input end. In the present embodiment, the block plate 221 is a slant plane disposed on the rotation shaft 220. The rotation shaft 220 is located at one end of the water temporary stop chamber 202; while a driving mechanism is provided to drive the rotation shaft 220 into rotation.

In the present embodiment, the water temporary stop chamber 202 is in contact with three connection ports 203 of the water input end, disposed around its peripheral. The angle between the adjacent connection ports 203 corresponds to the rotation angle of each rotation of the rotation shaft 220. The block plate 221 is disposed at the water temporary stop chamber 202 and the connection ports 203 of the water input end, to ensure that water is blocked and kept in the water temporary stop chamber 202.

The driving mechanism includes a press key 230. The rotation shaft 220 is provided with a continuous tooth face facing the press key 230. The press key 230 facing the rotation shaft 220 is provided with a ratchet acting in cooperation with the tooth face. The structure of the press key 230 and the rotation shaft 220 working in cooperation is similar to that of a rotation water separation member, or an inner core of an automatic pen. With each pressing of the press key 230, the rotation shaft 220 is made to rotate a certain angle along a slant face, while the press key 230 remains fixed and not rotated. An elastic piece is provided on the other end of the rotation shaft 220, to restore it to the original position when it is required.

In the present embodiment, in the water output device is provided with a plurality of water channels. A water separation plate 240 is connected and fixed to one end of the rotation shaft 220 near the switching chamber 201. The tight seal pad 210 and the water separation plate 240 are each provided with a plurality of water flow through holes 241, to allow the water flow to pass through. In the present embodiment, the water separation plate 240 is provided with two through holes 241; while the elastic piece is a spring 250, disposed between the water separation plate 240 and the tight seal cover 132. The inner side end face of the tight seal cover 132 is provided with protrusion columns, to restrict the position of the spring 250.

In application, a plurality of water flow close and open functions can be achieved through varying the number of through holes 241 of the water separation plate 240, and the rotation shaft 220 acting in cooperation.

In order to activate the press key 230 more directly and effectively, in the present embodiment, to make up for the gap between the shell 100 outside and the press key 230 inside, one end of the press key 230 is placed in the engine main body 131, while the other end is disposed to protrude out. Inside the shell 100 is further provided with a driving rod 260, to drive the press key 230 to realize pressing effectively. The driving rod 260 is of a crutch shape, with its outer end provided with a fold button 270, used to push the driving rod 260 to move. The fold button 270 is of an angle shape, with its angle portion hinge-connected to the shell 100. An outer end of the fold button 270 is disposed outside the shell 100, while an upper end of the fold button 270 acts in cooperation with an outer end of the driving rod 260. In operation, the driving rod 260 is pushed to move horizontally through rotating the fold button 270, thus bringing the press key 230 to realize pressing effectively.

In the present embodiment, a welding piece is disposed below the engine sleeve piece 130, while a water output tray is disposed below the welding piece. A water slant body and an impeller are provided between the water output tray and the welding piece, and is used to guide the direction of water flow, so that water can be output more evenly. The water output tray is provided with water output holes for outputting water, while the outer side of the water output tray is provided with a decoration cover.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A multi-function device capable of temporarily stopping water output, comprising:
    a water output device, having a water input end and a water output end, the water output device is provided with a plurality of water channels inside, to connect to the water input end and the water output end; and
    a switching mechanism, disposed in the water output device, to drive water flow to flow or stop, to realize water switching, the switching mechanism is located in the water channels nearing the water input end,
    wherein the water output device comprises a shell, that includes:
    a motor sleeve piece, fixed in the shell;
    a motor main body, disposed at one side of the motor sleeve piece;
    a tight seal cover, disposed at one other side of the motor sleeve piece; and
    a driving rod, used to drive a press key to realize pressing;
    a water separation plate and a tight seal pad are each disposed between the motor sleeve piece and the tight seal cover, a spring is disposed between the water separation plate and the tight seal cover, one end of the press key is disposed in the motor main body, while the other end is disposed protruding out of the motor main body.

2. The multi-function device capable of temporarily stopping water output as claimed in claim 1, wherein the switching mechanism comprises:
    a tight seal chamber, disposed in the water channels, it which includes:
    a switching chamber, connected and in communication with the water output end;
    a water temporary stop chamber, connected and in communication with the water input end;
    the tight seal pad, used to separate the switching chamber and the water temporary stop chamber;
    a rotation shaft, penetrating through the tight seal pad, and having a barrier plate, used to close the water temporary stop chamber and a connection port of the water input end; and
    a driving mechanism, located at one end of the rotation shaft near the water temporary stop chamber, and is used to drive the rotation shaft.

3. The multi-function device capable of temporarily stopping water output as claimed in claim 2, wherein the driving mechanism further includes:
    the press key, wherein the rotation shaft is provided with continuous tooth faces facing the press key;
    a ratchet, disposed at one end of the press key facing the rotation shaft, to act in cooperation with the tooth faces; and
    the spring, disposed at the other end of the rotation shaft, used to restore the rotation shaft.

4. The multi-function device capable of temporarily stopping water output as claimed in claim 3, wherein in the water output device is provided with the plurality of water channels, the water separation plate is connected and fixed to one end of the rotation shaft near the switching chamber, used to control switching of the water channels, and the tight seal pad and the water separation plate are each provided with corresponding water flow through holes, to allow water flow to pass through.

5. The multi-function device capable of temporarily stopping water output as claimed in claim 1, wherein the driving rod is of a crutch shape, with its outer end provided with a fold button, used to push the driving rod to move, the fold button is of an angle shape, with its angle portion hinge-connected to the shell, an outer end of the fold button is disposed outside the shell, an upper end of the fold button acts in cooperation with an outer end of the driving rod.

6. The multi-function device capable of temporarily stopping water output as claimed in claim 5, wherein the water temporary stop chamber is in communication with the plurality of connection ports of the water input end, disposed around its peripheral, and an angle between the adjacent connection ports corresponds to an angle of each rotation of the rotation shaft.

\* \* \* \* \*